(12) United States Patent
Wahl et al.

(10) Patent No.: US 8,787,530 B2
(45) Date of Patent: *Jul. 22, 2014

(54) TELECOMMUNICATION DIAGNOSTIC INFORMATION MANAGEMENT

(71) Applicant: Aware, Inc., Bedford, MA (US)

(72) Inventors: Jim Wahl, Nashua, NH (US); Michael Lund, West Newton, MA (US)

(73) Assignee: Aware, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,364

(22) Filed: Nov. 4, 2013

(65) Prior Publication Data

US 2014/0064459 A1 Mar. 6, 2014

Related U.S. Application Data

(63) Continuation of application No. 13/666,626, filed on Nov. 1, 2012, now Pat. No. 8,588,373, which is a continuation of application No. 12/761,596, filed on Apr. 16, 2010, now Pat. No. 8,345,825, which is a continuation of application No. 12/247,721, filed on Oct. 8, 2008, now Pat. No. 7,738,633, which is a continuation of application No. 10/553,907, filed as application No. PCT/US2004/014771 on May 12, 2004, now Pat. No. 7,471,771.

(60) Provisional application No. 60/470,106, filed on May 12, 2003.

(51) Int. Cl.
*H04M 1/24* (2006.01)
*H04M 3/06* (2006.01)
*H04M 3/22* (2006.01)

(52) U.S. Cl.
USPC ........... 379/1.01; 379/9.02; 379/28; 370/241; 375/222

(58) Field of Classification Search
USPC ............... 379/1.01, 1.03, 1.04, 9, 9.02, 9.04, 379/10.01, 10.03, 15.01, 22.02, 23, 24, 379/27.01, 28, 29.01, 32.04; 370/241, 252; 375/222, 224, 228
See application file for complete search history.

(56) References Cited

U.S. PATENT DOCUMENTS

| | | | |
|---|---|---|---|
| 5,063,523 A | 11/1991 | Vrenjak | |
| 5,159,685 A | 10/1992 | Kung | |
| 5,995,916 A | 11/1999 | Nixon et al. | |
| 6,237,114 B1 | 5/2001 | Wookey et al. | |

(Continued)

OTHER PUBLICATIONS

First Examination Report for Indian Patent Application No. 650/KOLNP/2008, dated Nov. 29, 2013.

(Continued)

*Primary Examiner* — Binh Tieu
(74) *Attorney, Agent, or Firm* — Jason H. Vick; Sheridan Ross, PC (57) ABSTRACT

A diagnostic tool is adapted to include the capability of initiating one or more diagnostic tests, collecting the raw data from the diagnostic test(s) and transporting the raw diagnostic data to an OSS. The OSS interprets the raw diagnostic data and stores the results in a database. The stored results can be searched, sorted, manipulated, analyzed, and the like. The results of any of these operations can then be, for example, displayed to one or more entities such as customer support, network operators, network planners, or the like.

19 Claims, 3 Drawing Sheets

(56) References Cited

U.S. PATENT DOCUMENTS

| | | | |
|---|---|---|---|
| 6,253,195 | B1 | 6/2001 | Hudis et al. |
| 6,404,861 | B1* | 6/2002 | Cohen et al. ............... 379/93.01 |
| 6,870,901 | B1 | 3/2005 | Gudmundsson et al. |
| 6,987,837 | B1 | 1/2006 | Blank et al. |
| 7,106,833 | B2 | 9/2006 | Kerpez |
| 7,106,834 | B2 | 9/2006 | Macdonald et al. |
| 7,120,122 | B1 | 10/2006 | Starr et al. |
| 7,434,099 | B2 | 10/2008 | Flynn et al. |
| 7,471,771 | B2 | 12/2008 | Wahl |
| 7,738,633 | B2 | 6/2010 | Wahl et al. |
| 7,920,677 | B2 | 4/2011 | Jiang et al. |
| 8,345,825 | B2 | 1/2013 | Wahl et al. |
| 8,588,373 | B2 | 11/2013 | Wahl et al. |
| 2002/0012388 | A1* | 1/2002 | Eldumiati et al. ............ 375/222 |
| 2002/0075326 | A1 | 6/2002 | Allen |
| 2002/0144187 | A1 | 10/2002 | Morgan et al. |
| 2002/0165952 | A1 | 11/2002 | Sewell et al. |
| 2003/0039240 | A1 | 2/2003 | Sutanto |
| 2003/0145075 | A1 | 7/2003 | Weaver et al. |
| 2004/0218613 | A1 | 11/2004 | Fortman |
| 2005/0210532 | A1 | 9/2005 | Winick |
| 2008/0095325 | A1 | 4/2008 | Chilton et al. |
| 2009/0247241 | A1* | 10/2009 | Gollnick et al. ............. 455/574 |

OTHER PUBLICATIONS

International Search Report for International (PCT) Patent Application No. PCT/US2004/014771, mailed Nov. 19, 2004.
Written Opinion for International (PCT) Patent Application No. PCT/US2004/014771, mailed Nov. 19, 2004.
International Preliminary Report on Patentability for International (PCT) Patent Application No. PCT/US2004/014771, mailed Dec. 1, 2005.
Official Action for Canadian Patent Application No. 2,523,482, dated Apr. 14, 2011.
Official Action for Canadian Patent Application No. 2,523,482, dated Jun. 8, 2012.
Official Action for Canadian Patent Application No. 2,523,482, dated May 14, 2013.
First Office Action (including translation) for Chinese Patent Application No. 200480013083.2, issued May 8, 2009.
The Second Office Action (including translation) for Chinese Patent Application No. 200480013083.2, issued Mar. 1, 2010.
Third Office Action (including translation) for Chinese Patent Application No. 200480013083.2, issued Dec. 27, 2010.
Fourth Office Action (including translation) for Chinese Patent Application No. 200480013083.2, issued Oct. 9, 2011.
Fifth Office Action (including translation) for Chinese Patent Application No. 200480013083.2, mailed May 4, 2012.
Rejection Decision (including translation) for Chinese Patent Application No. 200480013083.2, mailed Sep. 27, 2012.
Supplementary European Search Report for European Patent Application No. 04751931.9, dated Apr. 4, 2011.
Official Action for European Patent Application No. 04751931.9, dated Jun. 8, 2011.
Official Action for European Patent Application No. 04751931.9, dated Mar. 11, 2013.
First Examination Report for Indian Patent Application No. 02122/KOLNP/2005, dated Feb. 19, 2007.
Official Action for U.S. Appl. No. 10/553,907, mailed Jan. 17, 2008.
Notice of Allowance for U.S. Appl. No. 10/553,907, mailed Sep. 19, 2008.
Official Action for U.S. Appl. No. 12/247,721, mailed Jul. 22, 2009.
Notice of Allowance for U.S. Appl. No. 12/247,721, mailed Apr. 16, 2010.
Official Action for U.S. Appl. No. 12/761,596, mailed Dec. 1, 2011.
Official Action for U.S. Appl. No. 12/761,596, mailed Aug. 23, 2012.
Notice of Allowance for U.S. Appl. No. 12/761,596, mailed Sep. 25, 2012.
Official Action for U.S. Appl. No. 13/666,626, mailed Jun. 6, 2013.
Notice of Allowance for U.S. Appl. No. 13/666,626, mailed Sep. 3, 2013.
Cisco Systems Inc. "Cisco 6160 IP DSL Switch" http://www.bradreese.com/cisco/cisco-6160.pdf, 1992-2002.
Cisco Systems Inc. "Cisco 826 ADSL Router Business-Class ADSL over ISDN Access through the Power of Cisco IOS® Technology" http://www.reseler.com/ftp/udostepnione/CISC0826.pdf; 1992-2002.
Official Action for Canadian Application No. 2,523,482, mailed Apr. 1, 2014 (Attorney Ref. No. 5550-32-PCA).

* cited by examiner

TELECOMMUNICATION DIAGNOSTIC INFORMATION MANAGEMENT

RELATED APPLICATION DATA

This application is a Continuation of U.S. application Ser. No. 13/666,626, filed Nov. 1, 2012, now U.S. Pat. No. 8,588,373, which is a Continuation of U.S. application Ser. No. 12/761,596, filed Apr. 16, 2010, now U.S. Pat. No. 8,345,825, which is a Continuation of U.S. application Ser. No. 12/247,721 filed Oct. 8, 2008, now U.S. Pat. No. 7,738,633, which is a Continuation of U.S. application Ser. No. 10/553,907 filed Oct. 21, 2005, now U.S. Pat. No. 7,471,771, which is a national stage application under 35 U.S.C. 371 of PCT Application No. PCT/US2004/014771 filed, May 12, 2004, which claims the benefit of and priority under 35 U.S.C. §119(e) to U.S. Patent Application No. 60/470,106, filed May 12, 2003, entitled "Dr. DSL OSS Architecture," each of which are incorporated herein by reference in their entirety.

BACKGROUND OF THE INVENTION

1. Field of the Invention

This invention generally relates to communication systems. In particular, an exemplary embodiment of this invention relates to the acquisition, transmission and analysis of diagnostic information.

2. Description of Related Art

The exchange of diagnostic and test information between transceivers in a telecommunications environment is an important part of a telecommunications, such as a DSL, deployment. In cases where the connection is not performing as expected, for example, where the data rate is low, there are many bit errors, or the like, it could be advantageous to collect diagnostic and test information from, for example, a remote transceiver, such as a Customer Premises Equipment (CPE) modem. This is typically performed by dispatching a technician to the remote site, e.g., a truck roll, which can be time consuming, expensive and labor intensive.

In DSL technology, communications over a local subscriber loop between a Central Office (CO) and a subscriber premises is accomplished by modulating the data to be transmitted onto a multiplicity of discrete frequency carriers which are summed together and then transmitted over the subscriber loop. Individually, the carriers form discrete, non-overlapping communication subchannels of limited bandwidth. Collectively, the carriers form what is effectively a broadband communications channel. At a receiver, the carriers are demodulated and the transmitted data recovered.

DSL systems experience disturbances from other data services on adjacent phone lines, such as, for example, ADSL, HDSL, ISDN, T1, or the like. Furthermore, DSL systems can experience disturbances from other environmental factors such as, for example, temperature changes, radio interference, and the like. DSL systems can also experience disturbances from in-home devices such as telephones that may be connected to the same phone line with or without microfilters. Since DSL is envisioned as an always-on service, the effect of these disturbances should be reduced.

SUMMARY OF THE INVENTION

An exemplary aspect of this invention relates to data retrieval, organization and presentation thereof. A diagnostic tool collects data from a plurality of DSL sources, such as ADSL and ADSL2 CPE modems. This diagnostic information is then forwarded, via an accompanying network infrastructure, to an Operational Support System (OSS). The acquired data can be used to, for example, allow various groups within a telecommunications provider to analyze, manipulate, sort, and the like, the obtained diagnostic data independent of the particular DSL Central Office (CO) chipset and DSLAM (Digital Subscriber Line-Access Multiplexers) implementation.

For example, the diagnostic information can be used for customer care. In particular, the diagnostic information can be reviewed for one or more of the communication lines to determine if there is a problem within the home, for example, if there is a missing microfilter, or on the line, as with a bridged tap, or in the binder group, for example, as cross talk. The diagnostic information can also be used for network operation support to allow, for example, proactive troubleshooting of one or more lines where the performance has dropped below a bandwidth threshold or below a certain percentage. The diagnostic data can also be used by network planners to improve, for example, their knowledge of the network by understanding average loop topology, noise, DSL performance factors, and the like.

An exemplary operation of the system includes initiating one or more diagnostic tests, collecting the raw data from the diagnostic test(s) and transporting the raw diagnostic data to the OSS. The OSS interprets the raw diagnostic data and stores the results in a database. The stored results can be searched, sorted, manipulated, analyzed, and the like. The results of any of these operations can then be, for example, displayed to one or more entities such as customer support, network operators, network planners, or the like.

These and other features and advantages of this invention are described in, or are apparent from, the following description of the embodiments.

BRIEF DESCRIPTION OF THE DRAWINGS

The embodiments of the invention will be described in detailed, with reference to the following figures, wherein.

DETAILED DESCRIPTION

The exemplary embodiments of this invention will be described in relation to acquiring, forwarding and analyzing diagnostic information in a DSL environment. However, it should be appreciated, that in general, the systems and methods of this invention will work equally well for any type of communication system in any environment.

The exemplary systems and methods of this invention will also be described in relation to DSL modems and associated communication hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention, it should be appreciated however that the present invention may be practiced in a variety of ways beyond the specific details. For example, the systems and methods of this invention can generally be applied to any type of communication system.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as an operational support system and modem, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a CO modem, a CPE modem, or some combination thereof, and an operational support system.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software or combination of hardware and software that is capable of performing the functionality associated with an element.

Figure 1:
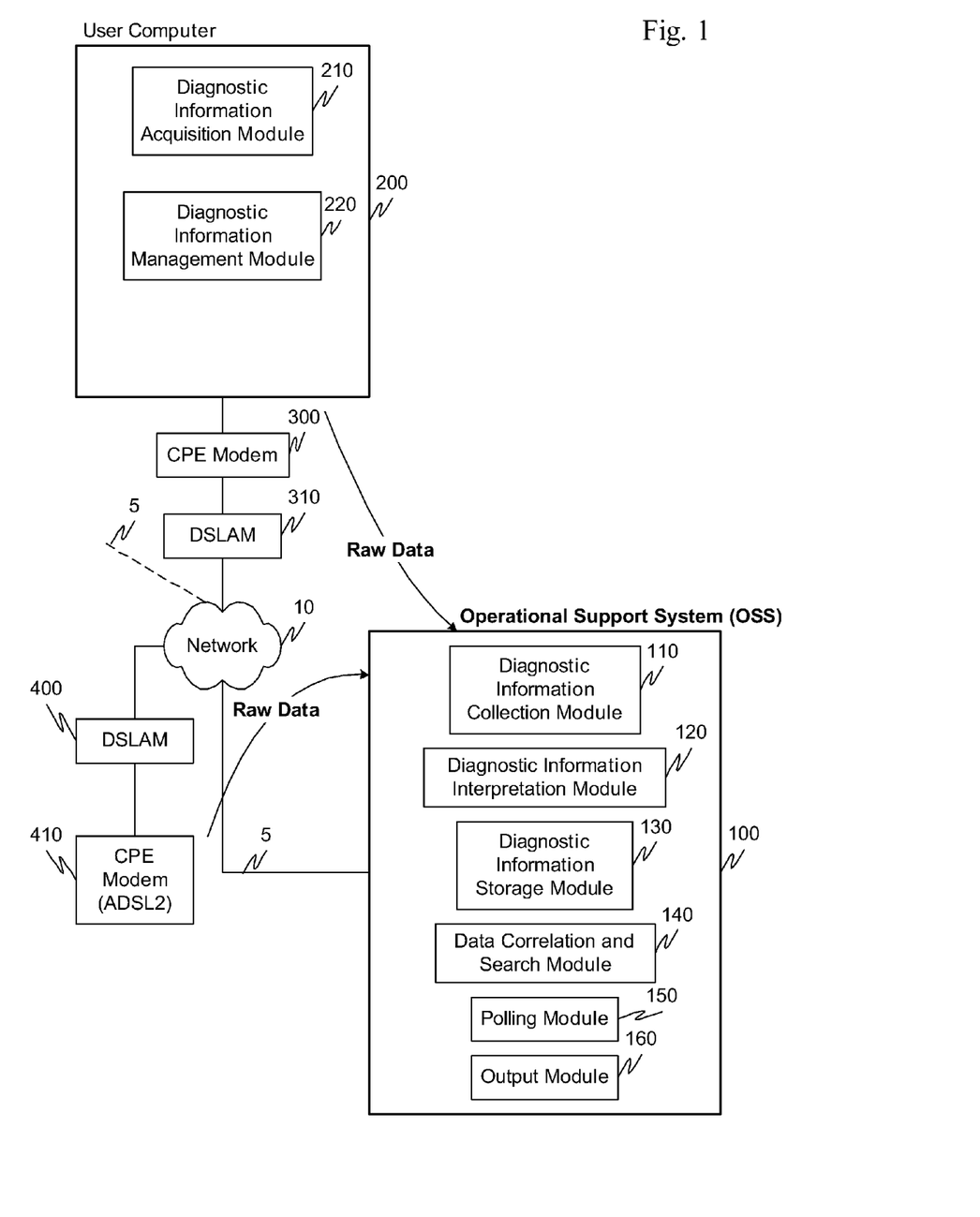
FIG. 1 is a functional block diagram illustrating an exemplary telecommunications data management system according to this invention.

FIG. 1 illustrates an exemplary embodiment of a diagnostic information tool according to this invention. In particular, the diagnostic information tool comprises an operational support system (OSS) 100, a user computer 200, one or more CPE modems 300 (not equipped with internal diagnostic capabilities), one or more DSLAM's 310, one or more CPE modems 410 (equipped with internal diagnostic capabilities, such as an ADSL2 modem), and one or more DSLAM's 400, all interconnected by links 5 and one or more networks 10. The OSS 100 comprises a diagnostic information collection module 110, a diagnostic information interpretation module 120, a diagnostic information storage module 130, a data correlation and search module 140, a polling module 150 and an output module 160. The user computer 200 comprises, in addition to the normal computer componentry, a diagnostic information acquisition module 210 and a diagnostic information management module 220.

In a first exemplary embodiment, the OSS 100 collects and analyzes diagnostic information from the CPE modem 300 that does not have internal diagnostic capabilities. Thus, the diagnostic information acquisition module 210 and diagnostic information management module 220 located on, for example, a user computer 200, are used to acquire and manage/forward, respectively, diagnostic information to the OSS 100.

In a second exemplary embodiment, the modem includes the componentry necessary for diagnostic information acquisition, and forwarding of that information to the OSS 100. For example, the CPE modem 410, due to its architecture, is capable of acquiring the diagnostic information without the necessity of having an associated user computer and/or modem driver software. The CPE modem 410 can, for example, collect the diagnostic information directly off of, for example, the ADSL physical layer using the embedded diagnostic tools which can forward the collected information to the operational support system 100.

For either of these systems, the initialization of diagnostic information acquisition is comparable. Either of the systems, e.g., user computer 200 and associated CPE modem 300, or the CPE modem 410, can be started in an automatic mode, a polling mode, a user initiated mode, or an OSS initiated mode.

In general, for either diagnostically enabled modems or modems without internal diagnostic capabilities, based on one or more of an instruction or pre-configured criteria, the modem commences training in a diagnostic mode. The modem then acquires diagnostic information relating to, for example, the communication link, signal-to-noise ratios, bit error rates, bridged tap information, cross talk information, noise issues at the modem premises, telephone(s) without microfilters, or the like. Upon acquiring the diagnostic information, the diagnostic information is forwarded, via the DSLAM, and network 10, to the OSS 100.

In the automated mode, the CPE modem 300, 410 automatically trains in a diagnostic mode, for example, at some predetermined interval such as every start-up, every start-up within a certain time period, only every predetermined number of start-ups, or the like, and then re-trains in a standard mode. This allows the carrier to automatically collect diagnostic data, for example, every time the modem trains and allows a diagnostic analysis thereof.

This double-training mechanism can be implemented in the diagnostic information management module 220 or, for example, within the modem driver software itself. In a similar matter, the diagnostic enabled CPE modem 410 can be configured to automatically initiate the diagnostic session, however, does not require the componentry of the separate user computer 200 in that the functionality for diagnostic information acquisition and forwarding is embedded therein.

The polling mode allows the OSS 100 to regulate if and when diagnostic information should be acquired. The CPE modem 300, 410 upon initialization, can query the polling module 150 to determine if diagnostic information acquisition is required. For example, the polling module 150 can include a table with, for example, an identifier of one or more CPE modems. Thus, when the CPE modem contacts the DSLAM 300, the OSS 110 is also queried, in particular the polling module 150, to determine if diagnostic information is required. If diagnostic information is requested, and in the case of CPE modem 300, the diagnostic information management module 220 instructs the diagnostic information acquisition module 210 to perform the requested test(s) in accordance with the information requested by the polling module 150. For example, the polling module 150 can request one or more specific tests are run either immediately or at a later time by the diagnostic information acquisition module 210.

The polling module 150 can also maintain, for example, a table that can be proactively updated to reflect desired requests for the acquisition of diagnostic information. For example, upon receiving a customer complaint, based on data throughput, or the like, the polling module 150 can update the frequency of diagnostic information acquisition. Table I below highlights some specific examples of the information the polling module 150 can maintain based on a specific identifier, such as a specific telephone number(s). In general however, any identifier can be used with comparable success.

TABLE I

| Telephone Number(s) | Poll Information |
|---|---|
| NPA-Nxx-Nyy | Perform Diagnostic test on every start-up for range of numbers |
| NPA-Nxx | Perform Diagnostic test at a predetermined interval such as once a week |
| NPA-Nxx | Perform Diagnostic test if selection criteria met, such as line length, geographic area, or any other selectable criteria |
| NPA-Nxx | Perform Diagnostic test if dynamically determined criteria satisfied, such as, support call recently received, low data rate detected on line, performance percentage below a threshold |

Upon receiving the instruction to acquire diagnostic information, the diagnostic information management module 220 instructs the diagnostic information acquisition module 210 to perform data collection. As discussed, this can be a "retriever" application that is modem-specific, and running on a user computer in communication with the CPE modem 300, via CPE drivers. The retriever application can also be embedded within the modem, such as in the CPE modem 410. In general, any type of "retriever" application can be used to acquire diagnostic information from the modem. Furthermore, the type of acquired information can be any information relating to, for example, the operation of one or more of the modem, communication link, and/or the central office modem.

In the case of the CPE modem 300, once the diagnostic information has been retrieved by the diagnostic information acquisition module 210, the diagnostic information acquisition module 210 cooperates with the diagnostic information management module 220 to forward raw data, via network 10 and links 5, to the operation support system 100, and in particular the diagnostic information collection module 110. Similarly, the CPE modem 410 forwards the raw data, via network 10 and links 5, to the operation support system 100, and in particular the diagnostic information collection module 110. It should be appreciated that the CPE modems 300, 410 could also store the raw diagnostic data and forward the data to the OSS 100 at a particular later time, or at the request of the OSS 100.

The initiation of diagnostic information acquisition can also be user initiated. For example, the user could cycle the power on the modem and/or select, via, for example, a graphical user interface associated with the modem the running of one or more diagnostic information acquisition features and/or tests.

The initiation of diagnostic information acquisition could also be commenced via an instruction received from the OSS 100. For example, the OSS 100 can forward an instruction to initiate diagnostic information acquisition to the CPE modem 410, or to the diagnostic information management module 220 which, in cooperation with the diagnostic information acquisition module 210, performs the diagnostic information acquisition.

The acquired diagnostic information for the CPE modem 300 can be stored in the diagnostic information management module 220 within the user computer 200. The acquired diagnostic information for the CPE modem 410 can stored in the CPE modem 410 itself.

The raw data is then forwarded to the OSS 100 via, for example, a higher-layer protocol such as, for example, an Internet Protocol (IP), Asynchronous Transfer Mode (ATM) protocol, a Hyper Text Transfer Protocol (HTTP), Simple Mail Transfer Protocol (SMTP), a Secure Sockets Layer (SSL) protocol, or in general any type of regular or robust communication protocol(s). Specifically, and in general, any protocol that is capable of transferring the diagnostic information from the user computer or the diagnostic acquisition enabled modem to the OSS 100 can be used with equal success with the systems and methods of this invention.

Once the OSS 100, and in particular the diagnostic information collection module 110, receives the raw diagnostic information, the OSS 100 can perform various manipulations of the raw data. To aid in tracking the raw diagnostic information, the diagnostic information collection module 110 acquires, for example, end user information that can be associated with the associated raw diagnostic information. For example, Table II illustrates various types user information with which the raw diagnostic data can be correlated.

TABLE II

| | End User Information | |
|---|---|---|
| IP Address | Dynamically assigned by carrier's DHCP server to end user's PC or to router | Captured by diagnostic information collection module IP address could be associated with particular user ID or circuit ID |
| Circuit ID | Unique identifier tied to user's ADSL service Can be used in provisioning and billing systems | Can be hard coded in user software Can be used as a unique key for a particular line |
| Trial ID | Unique Identifier that can be used, for example, for a particular trial or group of diagnostic test(s) | Can be assigned and associated with diagnostic information |
| CPE MAC Address | Media Access Control Unique fixed hardware address for CPE hard coded in CPE at time of manufacture | Can be captured by Diagnostic Information Collection Module Can be used to tie data to a particular modem to determine, for example, if a modem is producing inaccurate results and allows the correction of data in the interpretation DLL |
| User Name | User Name | Usually entered by user during installation |
| Service Level | Class of service | Can allow trouble reports based on class Can be entered by user during, for example, installation |
| Address | Street, City, State, Zip | Can be entered by user during installation Can be used to track/sort diagnostic data |
| NPA-Nxx | Area Code and First Three numbers of telephone number | Can track/sort results for a particular CO |

Having the raw data, analysis thereof can be performed. The diagnostic information interpretation module 120 provides the OSS 100 with this functionality. In particular, the diagnostic information interpretation module 120 can have, for example, a plurality of graphical user interfaces with lists of tests, sorts and/or filters that can be run on the raw data. A user can select from one or more of the tests, sorts and/or filters and perform an analysis that can be, for example, displayed graphically on the output module 160. A user could then have the option of storing one or more of the raw and analyzed diagnostic information in the diagnostic information storage module 130. The stored information can be, for example, indexed and sorted such that subsequent retrieval and correlation to other raw and/or analyzed results could be performed.

As more analyzed and raw data is accumulated and stored in the diagnostics information storage module 130, an operator of the OSS 100 can perform correlations and analysis between data received from one or more modems and historical information. For example, correlations between one or more modems, in one or more geographic areas and/or associated with one or more local loops can be analyzed over a specific time period, during specific environmental conditions, or the like. The results of these correlations can be output to, for example, the output module 160 and displayed to a user.

The user of the OSS 100 can also be provided with an interface that allows access to sort and/or search the information stored in the diagnostic information storage module 130. As with the correlation, the searching can be, for example, for specific criteria, based on end-user information, certain information characteristics, trending information, or the like. The output of this searching can also be output on the output module 160.

In general, sorting and/or searching can be performed on any of the raw or analyzed test information in any field. The OSS 100 should also be accessible to a plurality of parties in a plurality of locations. Accordingly, the OSS 100 could be outfitted with the appropriate architecture that allows for the access, through one or more of a secured or unsecured connections, to the various features therein.

In conjunction with acquisition of the raw diagnostic information, the diagnostic information collection module 110 can also obtain a circuit ID that is a unique identifier found in provisioning, billing, and other database systems. Given the IP address of the modem, the circuit ID can be determined and used as the identifier for storing information in the diagnostic information storage module 130. In addition, one or more of the user computer 200, CPE modem 410, and diagnostic information collection module 110 can record the date/time the diagnostic information was stored in the diagnostic information storage module 130. In addition, the raw and analyzed diagnostic information can be supplemented with one or more fields that allow, for example, user comments regarding the diagnostic testing. These comments can be, for example, specifics related to when the test was run and conditions associated therewith.

In addition, the circuit ID can be used for adding new users to the diagnostic information storage module 130. For example, upon receipt of the IP address, the circuit ID information from the most recent record associated with that circuit ID can be obtained. The registration information for the identified user in the diagnostic information storage module 130 can then be automatically updated. This information may also include end-user data that is generally available on the end-user's PC as a result of an enrollment process which is part of the standard end-user DSL installation.

The OSS 100 can also be equipped with administrative functionality to govern and regulate, for example, user access to the various functionality and data stored therein.

Various reports can be produced by the output module 160, in cooperation with one or more of data correlation and search module 140, diagnostic information storage module 130 and diagnostic information interpretation module 120. These reports can include, but are not limited to, collected raw data, analyzed data, single line analysis and administration, spectral analysis, rate verse reach correlation, troubleshooting information, customer care, and the like.

Single line analysis and administration can, for example, use circuit identifiers that match an initial search criteria to, with the help of the data correlation search module 140, one or more lines to analyze. A list of historical information for that line can be retrieved from the diagnostic information storage module 130 such that, for example, a comparison between historical test information and a current test can be performed. Records for that line can also be displayed with, for example, run date/time information, actual verse maximum upstream data rate information, actual and maximum downstream data rate information, data rate reduction due to cross talk information, microfilter status, and the like. The user could also be provided with a graphical user interface that allows, for example, through the selection of a check box or comparable selection icon, the re-running of any of the previously run tests, for example, immediately or, upon the next polling of the polling module 150.

The spectral analysis report can provide an analysis of the type of cross talk present in a carrier's network and impact on end-user service. For example, using a standard search criteria, a report can be generated with information relating to average cross talk impact, average noise floor, bandwidth reduction information, and cumulative information, such as, for example, the top ten lines with the greatest data rate reduction due to cross talk. For example, the average cross talk impact information can include the average data rate reduction due to cross talk, obtained at regular historical intervals for one or more circuits within the database that meet the search criteria. The average noise floor can be, for example, a graph illustrating the carrier's average noise floor using, for example, the most recently run diagnostic information for one or more of the circuits in the database that meet the search criteria. A graph of the output could also show, for example, the history of the noise floor from two weeks ago, two months ago, two years ago, twenty-four hours ago, or the like. The bandwidth reduction information can be, for example, a list of the cross talk sources, the number of lines where the identified cross talk source is the primary disturber, the power and data rate reduction associated therewith, and the like. For data and power rate reduction, a list of the average and standard deviation can also be shown and output on the output module 160.

The rate verse reach information can provide, for example, an analysis of rate verses reach using actual lines in the carrier's network. Using, for example, the standard search criteria, a report can be generated with information that includes rate and reach distribution and a plot of the rate and reach for one or more lines showing the average in bars and showing the standard deviation in, for example, 500 or 1000 ft. increments. Additionally, a correlation coefficient can show how well reach estimations predict rate.

A troubleshooter report can provide a list of lines where performance has dropped more than a given percentage or below, for example, a threshold in one or more categories. In addition to the standard search criteria, a second search could be performed, allowing the user to sub-select any one or more of the following: period, maximum data rate percentage decrease, actual data rate near threshold, or the like. The period can be defined as a comparison period, and the current test data can be compared with historical data from an initial installation, or any other time period at a given instant or during a specified duration thereafter. The maximum data rate percentage decrease can be illustrated, for example, in a graphical format using, for example, color coded graphs. Lines above, for example, a certain service threshold, can be illustrated in one color, like green, while lines at or below a certain committed rate could be colored yellow and red, respectively, Similarly, the actual data rate and threshold data rate could be illustrated graphically where when, for example, a line's actual data rate is below a threshold. In addition, and with the cooperation of the diagnostic information interpretation module 120 and output module 160, the diagnostic information tool could be used to provide simple, yet valuable information, to, for example, customer care representatives and/or service subscribers that may have little to no training. For example, in attempting to diagnose problems with a particular line, a search can be run with the cooperation of the data correlation and search module 140 and output module 160. For example, upon a customer care representative receiving a customer care support call, a search for the user's identifier can be performed and historical diagnostic information about the user's line retrieved from the diagnostic information storage module 130. The output module 160, in cooperation with the data correlation and search module 140 could then, for example, assemble and present to the customer care support representative a graphical interface that allows, for example, selection of various test that could be performed, access to historical test information, and/or proposed solutions based on one or more of raw and analyzed current and/or historical diagnostic information.

For example, upon performing a search for a user's identifier, the user's information could be retrieved and displayed with the cooperation of the output module 160. A list of, for example, the top ten tests for that line could then be displayed with, for example, the customer care representative being able to select, for example, with the click of a mouse, the test they would like run and/or the retrieval of historical information from one or more previously run tests. For each of the test(s), historical information can be illustrated graphically with, for example, color coded charts that are correlated to performance criteria. In addition, a chart can be used to, for example, assist the customer care representative with walking an end-user through self-help diagnostics to, for example, add a new microfilter and run a test to see if any improvement in line conditions are achieved, or the like.

A user, such as a system administrator, could also automate one or more testing procedures. For example, a user could perform a search of one or more of the diagnostic information storage module and a database of end users (not shown) and identify one or more systems for testing. Then, using one or more of automatic, polling based, user initiated and OSS initiated triggering, the identified systems are "queued" to enter the diagnostic mode. Upon entering the diagnostic mode, all the identified systems forward to the OSS 100 the raw diagnostic information about one or more of the CPE modem, line conditions and the CO modem. The OSS 100, in cooperation with the appropriate modules, could then analyze the raw diagnostic data and automatically generate one or more reports based thereon.

For example, if a known problem in a specific geographic area or within a certain phone number range was experiencing problems, the data correlation and search module could automatically identify all the modems within the area, specify the time and type(s) of diagnostic tests to be performed, forward an instruction to perform the test and/or update the polling module if appropriate, and wait for the receipt of the raw diagnostic data upon completion of the test(s). More specifically, if a problem was occurring at a particular time, or during a particular environmental condition, such as a temperature change or apparent electronic interference, one or more CPE modems could run diagnostic tests at that time. This could aid, for example, diagnosis of system problems whose influence on one or more of the CPE modem, line or CO modem may not be consistent or continuous.

Figure 2:
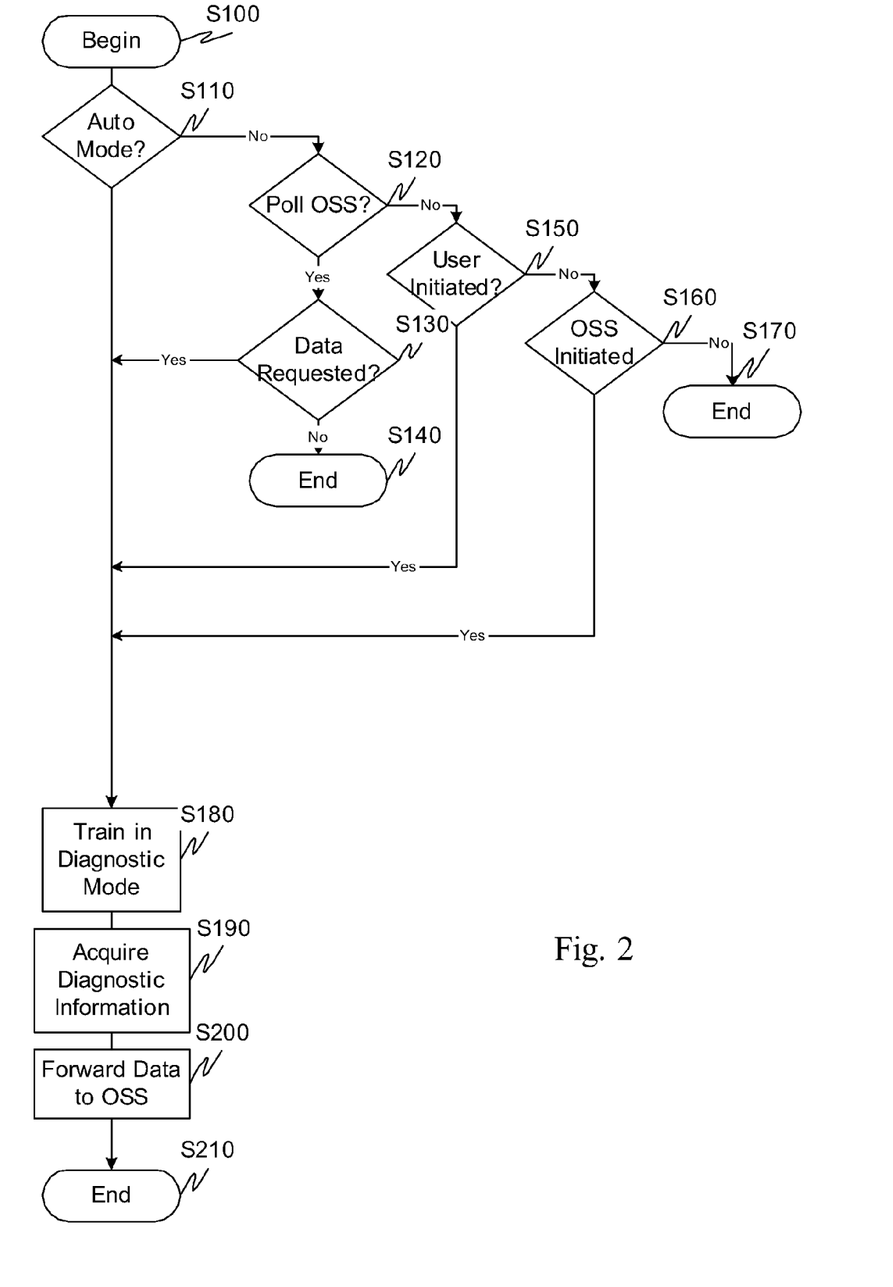
FIG. 2 is a flowchart illustrating an exemplary method of acquiring and forwarding diagnostic information according to this invention.

FIG. 2 illustrates and exemplary method of acquiring diagnostic information according to this invention. In particular, control begins in step S100 and continues to step S110. In step S110, a determination is made whether diagnostic information should be acquired in an automatic mode. If diagnostic information is to be acquired in an automatic mode, control jumps to step S180. Otherwise, control continues to step S120.

In step S120, a determination is made whether to poll the OSS to determine whether to acquire diagnostic information. If the OSS is to be polled, control jumps to step S130 where a determination is made whether the OSS is requesting diagnostic information. Otherwise, control continues to step S150.

In step S130, if the OSS requests diagnostic data, control continues to step S180. Otherwise control jumps to step S140 where the control sequence ends.

In step S150, a determination is made whether a user initiated diagnostic information request has been selected. If a user initiated diagnostic information request has been selected, control jumps to step S180. Otherwise, control continues to step S160.

In step S160, a determination is made whether an operational support system initiated diagnostic information request has been received. If an OSS initiated diagnostic information acquisition request has been received, control jumps to step S180. Otherwise, control continues to step S170 where the control sequence ends.

In step S180, the modem trains in the diagnostic information acquisition mode to secure the raw diagnostic information. Next, in step S190, the raw diagnostic information is acquired for one or more diagnostic tests. Then in step S200, the acquired diagnostic information is forwarded to the operational support system. Control then continues to step S210 where the control sequence ends.

Figure 3:
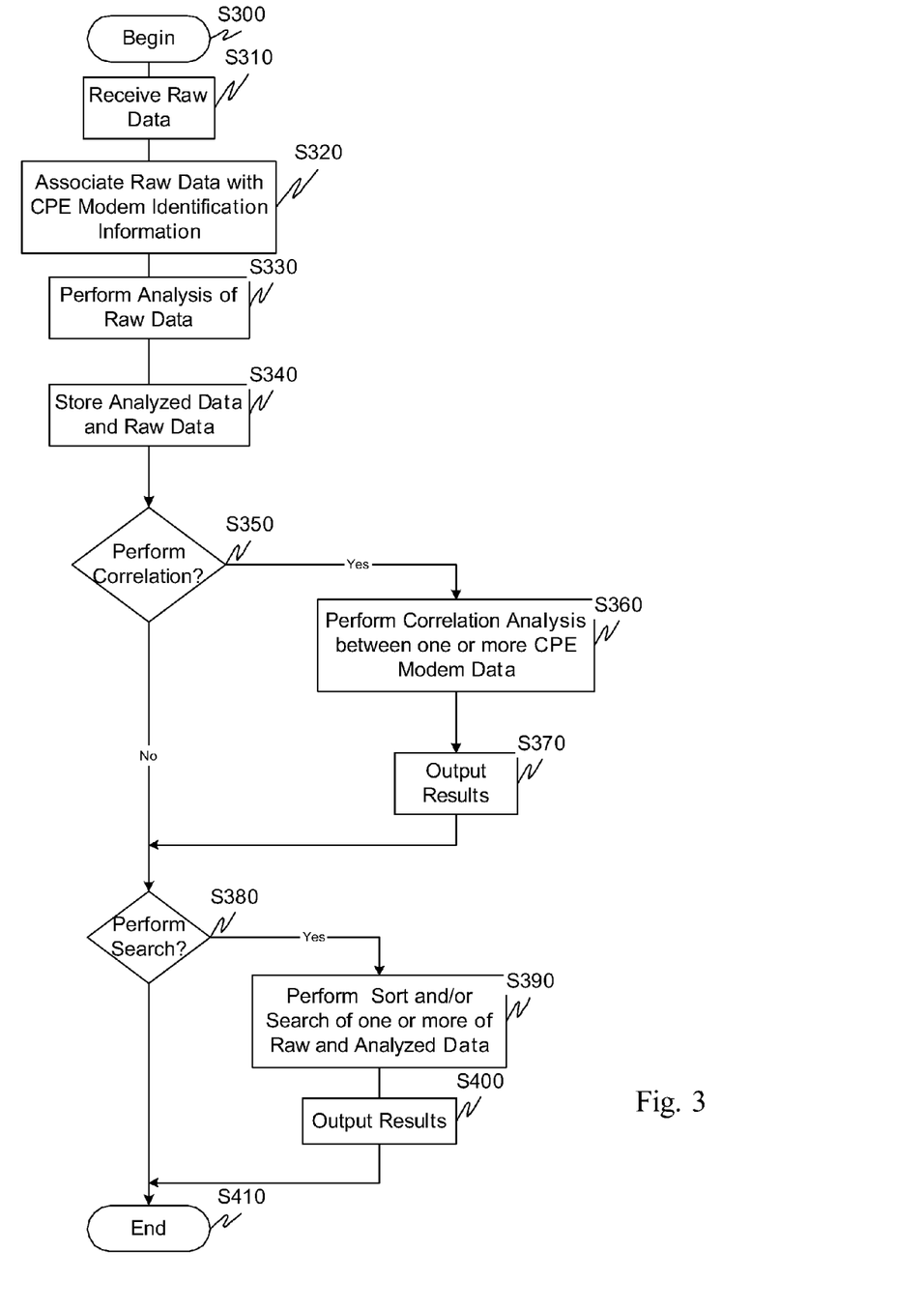
FIG. 3 is a flowchart illustrating an exemplary method of analyzing and manipulating diagnostic information according to this invention.

FIG. 3 outlines an exemplary method of manipulating the raw data according to this invention. In particular, control begins at step S300 and continues to step S310. In step S310, the raw data is received. Next, in step S320, the raw data is associated with a particular modem, and hence, for example, a particular user. Next, in step S330, an analysis of the raw data can be performed and result thereof stored in step S340. For example, upon receiving the raw data and knowing the modem identification, a certain set of test(s) can be automatically run and the analyzed data stored.

For example, if there is known trouble within a certain area, certain test(s) can automatically be run that can, for example, assist a customer care representative with upcoming support calls. In addition, raw data can simply be acquired from one or more modems at, for example, predetermined intervals and stored to provide, for example, historical information that can be used to, for example, diagnose future performance related issues. In general, diagnostic information can be acquired at any time, and analysis thereof performed any time thereafter and there is no restriction on the frequency with which raw data can be acquired.

In step S350, a determination is made whether to perform a correlation between various portions of diagnostic information. If a correlation is to be performed, control continues to step S360. Otherwise, control jumps to step S380.

In step S360, the correlation if performed and in step S370 the result output. Control then continues to step S380.

In step S380, a determination is made whether to perform a search for one or more of specific modem diagnostic information, performance information, user information, or the like. If a search is to be performed, control continues to step S390. Otherwise, control jumps to step S410 where the control sequence ends.

In step S390, the sort and/or search of one or more of the raw and analyzed data and/or field(s) associated therewith is performed. The output of the sort and/or search is then output in step S400. Control then continues to step S410 where the control sequence ends.

The above-described system can be implemented on wired and/or wireless telecommunications devices, such a modem, a multicarrier modem, a DSL modem, an ADSL modem, an XDSL modem, a VDSL modem, a multicarrier transceiver, a wired and/or wireless wide/local area network system, a satellite communication system, or the like, or on a separate programmed general purpose computer having a communications device. Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, modem, transmitter/receiver, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein however can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver and operations support system.

It is therefore apparent that there has been provided, in accordance with the present invention, systems and methods for exchanging communication parameters. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

We claim:

1. A telecommunications information management system comprising:
    a diagnostic information collection module configured to obtain raw diagnostic information from one or more multicarrier modems utilizing a high-layer protocol when a connection is not performing as expected;
    a diagnostic information interpretation module configured to analyze the raw diagnostic information; and
    a data search and correlation module configured perform searches of the raw diagnostic information and analyzed diagnostic information.

2. The system of claim 1, further comprising a polling module that identifies when one or more of the one or more modems are to perform a diagnostic test.

3. The system of claim 1, further comprising a searchable diagnostic information storage module that stores the raw diagnostic information and the analyzed diagnostic information.

4. The system of claim 1, wherein the data search and correlation module performs one or more of searches of historical information, comparisons of historical information from one or more modems to one or more other modems, correlations between one or more of the raw diagnostic information and analyzed diagnostic information, retrieves of one or more of modem or user information and performs historical trending information.

5. The system of claim 1, wherein the one or more modems are one or more of a modem with internal diagnostic capabilities and a modem adapted to communicate with a personal computer having diagnostic modules.

6. The system of claim 1, further comprising an output module adapted to cooperate with the data correlation module and diagnostic information interpretation module to provide a user with repair solutions.

7. The system of claim 1, wherein the high-layer protocol is one or more of an internet protocol (IP), asynchronous transfer mode (ATM) protocol, a Hyper Text Transfer Protocol (HTTP) and a Simple Mail Transfer Protocol (SMTP).

8. The system of claim 1, wherein a request to obtain the raw diagnostic information can be one or more of automatically initiated, polling based, user initiated and operations support center initiated.

9. The system of claim 1, further comprising an output module adapted to display one or more of the raw diagnostic information and the analyzed diagnostic information, modem information, user information, available tests, most popular tests and repair instructions.

10. A telecommunications information management method comprising:
    obtaining raw diagnostic information from one or more multicarrier modems utilizing a high-layer protocol when a connection is not performing as expected;
    analyzing the raw diagnostic information;
    storing the raw diagnostic information and the analyzed diagnostic information; and
    searching the raw diagnostic information and analyzed diagnostic information.

11. The method of claim 10, further comprising polling to determine when one or more of the one or more modems are to perform a diagnostic test.

12. The method of claim 10, wherein the searching includes one or more of searches of historical information, comparisons of historical information from one or more modems to one or more other modems, obtaining correlations between one or more of the raw diagnostic information and analyzed diagnostic information, retrieval of one or more of modem or user information and performing historical trending information retrieval.

13. The method of claim 10, wherein the one or more modems are one or more of a modem with internal diagnostic capabilities and a modem adapted to communicate with a personal computer having diagnostic functionality.

14. The method of claim 10, further comprising providing repair solutions.

15. The method of claim 10, wherein the high-layer protocol is one or more of an internet protocol (IP), asynchronous transfer mode (ATM) protocol, a Hyper Text Transfer Protocol (HTTP) and a Simple Mail Transfer Protocol (SMTP).

16. The method of claim 10, wherein a request to obtain the raw diagnostic information can be one or more of automatically initiated, polling based, user initiated and operations support center initiated.

17. The method of claim 10, further comprising displaying one or more of the raw diagnostic information and the analyzed diagnostic information, modem information, user information, available tests, most popular tests and repair instructions.

18. A non-transitory computer-readable information storage media having stored thereon instructions, that when executed by a processor, cause to be performed a telecommunications information management method comprising:
 obtaining raw diagnostic information from one or more multicarrier modems utilizing a high-layer protocol when a connection is not performing as expected;
 analyzing the raw diagnostic information;
 storing the raw diagnostic information and the analyzed diagnostic information; and
 searching the raw diagnostic information and analyzed diagnostic information.

19. The media of claim 18, wherein the high-layer protocol is one or more of an internet protocol (IP), asynchronous transfer mode (ATM) protocol, a Hyper Text Transfer Protocol (HTTP) and a Simple Mail Transfer Protocol (SMTP).

* * * * *